United States Patent
Frank et al.

(10) Patent No.: US 9,696,939 B1
(45) Date of Patent: Jul. 4, 2017

(54) REPLICATING DATA USING DEDUPLICATION-BASED ARRAYS USING NETWORK-BASED REPLICATION

(71) Applicant: EMC Corporation, Hopkinton, MA (US)

(72) Inventors: Shahar Frank, Ramat Hasharon (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 816 days.

(21) Appl. No.: 13/826,966

(22) Filed: Mar. 14, 2013

(51) Int. Cl.
 *G06F 15/167* (2006.01)
 *G06F 3/06* (2006.01)

(52) U.S. Cl.
 CPC .................... *G06F 3/065* (2013.01)

(58) Field of Classification Search
 CPC ........ G06F 3/065; G06F 3/067; G06F 3/0641; G06F 3/0689; G06F 11/1451; G06F 11/1453; G06F 11/2094; G06F 17/30156; H04L 67/1095; H04L 63/0428
 See application file for complete search history.

(56) References Cited

U.S. PATENT DOCUMENTS

| | | |
|---|---|---|
| 5,170,480 A | 12/1992 | Mohan et al. |
| 5,388,254 A | 2/1995 | Betz et al. |
| 5,499,367 A | 3/1996 | Bamford et al. |
| 5,864,837 A | 1/1999 | Maimone |
| 5,879,459 A | 3/1999 | Gadgil et al. |
| 5,990,899 A | 11/1999 | Whitten |
| 6,042,652 A | 3/2000 | Hyun et al. |
| 6,065,018 A | 5/2000 | Beier et al. |
| 6,143,659 A | 11/2000 | Leem |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

'Oracle Solaris ZFS Administration Guide'. Manual [online]. Oracle, Apr. 2012 [retrieved on Jun. 18, 2015]. Retrieved from the Internet: <URL: http://docs.oracle.com/cd/E23823_01/pdf/819-5461.pdf>. Citing pp. 218 to 229.*

(Continued)

*Primary Examiner* — Kevin Bates
*Assistant Examiner* — Dae Kim
(74) *Attorney, Agent, or Firm* — Daly, Crowley, Mofford & Durkee, LLP (57) ABSTRACT

In one aspect, a method to send a snapshot to a replication site includes generating a first snapshot of a production storage volume at a first point in time, generating a second snapshot of the production storage volume at a second point in time after the first point in time, obtaining differences between the first snapshot and the second snapshot, reading signatures from the production storage volume, sending the signatures to the replication site, writing the signatures to the replication site, reading data from changed locations in the second snapshot which is not at the replication site and sending the data from the changed locations to the replication site comprising a replica volume replicating the production storage volume. The production storage volume is part of a deduplication-based storage array.

18 Claims, 4 Drawing Sheets

(56) References Cited

U.S. PATENT DOCUMENTS

| | | | |
|---|---|---|---|
| 6,148,340 A | 11/2000 | Bittinger et al. | |
| 6,174,377 B1 | 1/2001 | Doering et al. | |
| 6,174,809 B1 | 1/2001 | Kang et al. | |
| 6,203,613 B1 | 3/2001 | Gates et al. | |
| 6,260,125 B1 | 7/2001 | McDowell | |
| 6,270,572 B1 | 8/2001 | Kim et al. | |
| 6,272,534 B1 | 8/2001 | Guha | |
| 6,287,965 B1 | 9/2001 | Kang et al. | |
| 6,467,023 B1 | 10/2002 | DeKoning et al. | |
| 6,574,657 B1 | 6/2003 | Dickinson | |
| 6,621,493 B1 | 9/2003 | Whitten | |
| 6,804,676 B1 | 10/2004 | Bains, II | |
| 6,947,981 B2 | 9/2005 | Lubbers et al. | |
| 7,043,610 B2 | 5/2006 | Horn et al. | |
| 7,076,620 B2 | 7/2006 | Takeda et al. | |
| 7,111,197 B2 | 9/2006 | Kingsbury et al. | |
| 7,117,327 B2 | 10/2006 | Hirakawa et al. | |
| 7,120,768 B2 | 10/2006 | Mizuno et al. | |
| 7,130,975 B2 | 10/2006 | Suishu et al. | |
| 7,139,927 B2 | 11/2006 | Park et al. | |
| 7,146,439 B1 | 12/2006 | Ofer et al. | |
| 7,159,088 B2 | 1/2007 | Hirakawa et al. | |
| 7,167,963 B2 | 1/2007 | Hirakawa et al. | |
| 7,203,741 B2 | 4/2007 | Marco et al. | |
| 7,222,136 B1 | 5/2007 | Brown et al. | |
| 7,296,008 B2 | 11/2007 | Passerini et al. | |
| 7,328,373 B2 | 2/2008 | Kawamura et al. | |
| 7,360,113 B2 | 4/2008 | Anderson et al. | |
| 7,426,618 B2 | 9/2008 | Vu et al. | |
| 7,516,287 B2 | 4/2009 | Ahal et al. | |
| 7,519,625 B2 | 4/2009 | Honami et al. | |
| 7,519,628 B1 | 4/2009 | Leverett | |
| 7,546,485 B2 | 6/2009 | Cochran et al. | |
| 7,577,867 B2 | 8/2009 | Lewin et al. | |
| 7,606,940 B2 | 10/2009 | Yamagami | |
| 7,627,612 B2 | 12/2009 | Ahal et al. | |
| 7,627,687 B2 | 12/2009 | Ahal et al. | |
| 7,719,443 B1 | 5/2010 | Natanzon | |
| 7,757,057 B2 | 7/2010 | Sangapu et al. | |
| 7,769,931 B1 | 8/2010 | Angelone et al. | |
| 7,774,565 B2 | 8/2010 | Lewin et al. | |
| 7,797,358 B1 | 9/2010 | Ahal et al. | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,849,361 B2 | 12/2010 | Ahal et al. | |
| 7,860,836 B1 | 12/2010 | Natanzon et al. | |
| 7,882,286 B1 | 2/2011 | Natanzon et al. | |
| 7,904,681 B1 | 3/2011 | Bappe et al. | |
| 7,908,515 B1 | 3/2011 | Schechner et al. | |
| 7,934,262 B1 | 4/2011 | Natanzon et al. | |
| 7,945,640 B1 | 5/2011 | Van Tine | |
| 7,958,372 B1 | 6/2011 | Natanzon | |
| 7,962,567 B1 | 6/2011 | Sandstrom et al. | |
| 8,037,162 B2 | 10/2011 | Marco et al. | |
| 8,041,940 B1 | 10/2011 | Natanzon et al. | |
| 8,060,713 B1 * | 11/2011 | Natanzon | G06F 17/30368 711/162 |
| 8,060,714 B1 * | 11/2011 | Natanzon | G06F 7/00 707/640 |
| 8,103,937 B1 | 1/2012 | Natanzon et al. | |
| 8,108,634 B1 | 1/2012 | Natanzon et al. | |
| 8,131,924 B1 * | 3/2012 | Frandzel | G06F 3/0608 711/111 |
| 8,140,821 B1 | 3/2012 | Raizen et al. | |
| 8,150,936 B2 | 4/2012 | Liu et al. | |
| 8,166,314 B1 | 4/2012 | Raizen et al. | |
| 8,205,009 B2 | 6/2012 | Heller et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |
| 8,341,115 B1 | 12/2012 | Natanzon et al. | |
| 8,370,648 B1 | 2/2013 | Natanzon | |
| 8,380,885 B1 | 2/2013 | Natanzon | |
| 8,392,680 B1 | 3/2013 | Natanzon et al. | |
| 8,429,362 B1 | 4/2013 | Natanzon et al. | |
| 8,433,869 B1 | 4/2013 | Natanzon et al. | |
| 8,438,135 B1 | 5/2013 | Natanzon et al. | |
| 8,464,101 B1 | 6/2013 | Natanzon et al. | |
| 8,478,955 B1 | 7/2013 | Natanzon et al. | |
| 8,495,304 B1 | 7/2013 | Natanzon et al. | |
| 8,510,279 B1 | 8/2013 | Natanzon et al. | |
| 8,521,691 B1 | 8/2013 | Natanzon | |
| 8,521,694 B1 | 8/2013 | Natanzon | |
| 8,543,609 B1 | 9/2013 | Natanzon | |
| 8,583,885 B1 | 11/2013 | Natanzon | |
| 8,600,945 B1 | 12/2013 | Natanzon et al. | |
| 8,601,085 B1 | 12/2013 | Ives et al. | |
| 8,627,012 B1 | 1/2014 | Derbeko et al. | |
| 8,683,592 B1 | 3/2014 | Dotan et al. | |
| 8,694,700 B1 | 4/2014 | Natanzon et al. | |
| 8,706,700 B1 | 4/2014 | Natanzon et al. | |
| 8,712,962 B1 | 4/2014 | Natanzon et al. | |
| 8,719,497 B1 | 5/2014 | Don et al. | |
| 8,725,691 B1 | 5/2014 | Natanzon | |
| 8,725,692 B1 | 5/2014 | Natanzon et al. | |
| 8,726,066 B1 | 5/2014 | Natanzon et al. | |
| 8,738,813 B1 | 5/2014 | Natanzon et al. | |
| 8,745,004 B1 | 6/2014 | Natanzon et al. | |
| 8,751,828 B1 | 6/2014 | Raizen et al. | |
| 8,769,336 B1 | 7/2014 | Natanzon et al. | |
| 8,805,786 B1 | 8/2014 | Natanzon | |
| 8,806,161 B1 | 8/2014 | Natanzon | |
| 8,825,848 B1 | 9/2014 | Dotan et al. | |
| 8,832,399 B1 | 9/2014 | Natanzon et al. | |
| 8,850,143 B1 | 9/2014 | Natanzon | |
| 8,850,144 B1 | 9/2014 | Natanzon et al. | |
| 8,862,546 B1 | 10/2014 | Natanzon et al. | |
| 8,892,835 B1 | 11/2014 | Natanzon et al. | |
| 8,898,112 B1 | 11/2014 | Natanzon et al. | |
| 8,898,409 B1 | 11/2014 | Natanzon et al. | |
| 8,898,515 B1 | 11/2014 | Natanzon | |
| 8,898,519 B1 | 11/2014 | Natanzon et al. | |
| 8,914,595 B1 | 12/2014 | Natanzon | |
| 8,924,668 B1 | 12/2014 | Natanzon | |
| 8,930,500 B2 | 1/2015 | Marco et al. | |
| 8,930,947 B1 | 1/2015 | Derbeko et al. | |
| 8,935,498 B1 | 1/2015 | Natanzon | |
| 8,949,180 B1 | 2/2015 | Natanzon et al. | |
| 8,954,673 B1 | 2/2015 | Natanzon et al. | |
| 8,954,796 B1 | 2/2015 | Cohen et al. | |
| 8,959,054 B1 | 2/2015 | Natanzon | |
| 8,977,593 B1 | 3/2015 | Natanzon et al. | |
| 8,977,826 B1 | 3/2015 | Meiri et al. | |
| 8,996,460 B1 | 3/2015 | Frank et al. | |
| 8,996,461 B1 | 3/2015 | Natanzon et al. | |
| 8,996,827 B1 | 3/2015 | Natanzon | |
| 9,003,138 B1 | 4/2015 | Natanzon et al. | |
| 9,026,696 B1 | 5/2015 | Natanzon et al. | |
| 9,031,913 B1 | 5/2015 | Natanzon | |
| 9,032,160 B1 | 5/2015 | Natanzon et al. | |
| 9,037,818 B1 | 5/2015 | Natanzon et al. | |
| 9,063,994 B1 | 6/2015 | Natanzon et al. | |
| 9,069,479 B1 | 6/2015 | Natanzon | |
| 9,069,709 B1 | 6/2015 | Natanzon et al. | |
| 9,081,754 B1 | 7/2015 | Natanzon et al. | |
| 9,081,842 B1 | 7/2015 | Natanzon et al. | |
| 9,087,008 B1 | 7/2015 | Natanzon | |
| 9,087,112 B1 | 7/2015 | Natanzon et al. | |
| 9,104,529 B1 | 8/2015 | Derbeko et al. | |
| 9,110,914 B1 | 8/2015 | Frank et al. | |
| 9,116,811 B1 | 8/2015 | Derbeko et al. | |
| 9,128,628 B1 | 9/2015 | Natanzon et al. | |
| 9,128,855 B1 | 9/2015 | Natanzon et al. | |
| 9,134,914 B1 | 9/2015 | Derbeko et al. | |
| 9,135,119 B1 | 9/2015 | Natanzon et al. | |
| 9,135,120 B1 | 9/2015 | Natanzon | |
| 9,146,878 B1 | 9/2015 | Cohen et al. | |
| 9,152,339 B1 | 10/2015 | Cohen et al. | |
| 9,152,578 B1 | 10/2015 | Saad et al. | |

(56) References Cited

U.S. PATENT DOCUMENTS

| | | |
|---|---|---|
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 2002/0129168 A1 | 9/2002 | Kanai et al. |
| 2003/0061537 A1 | 3/2003 | Cha et al. |
| 2003/0110278 A1 | 6/2003 | Anderson |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0195670 A1 | 8/2006 | Iwamura et al. |
| 2006/0212462 A1 | 9/2006 | Heller et al. |
| 2007/0055833 A1 | 3/2007 | Vu et al. |
| 2007/0180304 A1 | 8/2007 | Kano |
| 2007/0185973 A1* | 8/2007 | Wayda .................. G06F 3/0607 709/217 |
| 2007/0198602 A1 | 8/2007 | Ngo et al. |
| 2007/0198791 A1 | 8/2007 | Iwamura et al. |
| 2007/0266053 A1 | 11/2007 | Ahal et al. |
| 2008/0082592 A1 | 4/2008 | Ahal et al. |
| 2012/0017060 A1* | 1/2012 | Kapanipathi ......... G06F 3/0608 711/162 |
| 2012/0197844 A1* | 8/2012 | Wang ................ G06F 11/1464 707/646 |
| 2013/0036091 A1* | 2/2013 | Provenzano ...... G06F 17/30162 707/624 |

OTHER PUBLICATIONS

Microsoft Computer Dictionary, 2002 Press Fifth Edition, p. 58.

Soules et al.; "Metadata Efficiency in a Comprehensive Versioning File System", May 2002, CMU-CS-02-145, School of Computer Science, Carnegie Mellon University, Pittsburgh, PA 15213, 33 pages.

Office Action dated Dec. 21, 2011, U.S. Appl. No. 12/045,946, 14 pages.

Office Action dated Jan. 23, 2012, U.S. Appl. No. 12/818,236, 17 Pages.

Soules, Metadata Efficiency in Versioning File Systems, 2003, pp. 1-16.

AIX Systems Management Concepts: Operating Systems and Devices May 2000, pp. 1-280.

Office Action dated Mar. 31, 2009 for U.S. Appl. No. 11/609,560, 15 pages.

Response to Office Action filed Jun. 10, 2009 in U.S. Appl. No. 11/609,560, 18 pages.

Office Action dated Oct. 21, 2009 for U.S. Appl. No. 11/609,560, 34 pages.

Response to Office Action filed on Jan. 14, 2010 in U.S. Appl. No. 11/609,560, 16 pages.

Notice of Allowance dated Sep. 27, 2011 for U.S. Appl. No. 11/609,560, 13 pages.

Office Action dated Aug. 17, 2011 for U.S. Appl. No. 12/057,652, 19 pages.

Response to Office Action filed on Sep. 1, 2011 in U.S. Appl. No. 12/057,652, 9 pages.

Notice of Allowance dated Sep. 27, 2011 for U.S. Appl. No. 12/057,652, 8 pages.

Office Action dated Jun. 11, 2009 for U.S. Appl. No. 11/609,561 7 pages.

Response to Office Action filed on Sep. 16, 2009 in U.S. Appl. No. 11/609,561 12 pages.

Office Action dated Jan. 11, 2010 for U.S. Appl. No. 11/609,561 10 pages.

Pre-Appeal Brief Request for Review filed Mar. 25, 2010 in U.S. Appl. No. 11/609,561 6 pages.

Notice of Panel Decision from Pre-Appeal Brief Review dated Juiy 16, 2010 in U.S. Appl. No. 11/609,561, 2 pages.

Notice of Allowance dated Sep. 14, 2010 in U.S. Appl. No. 11/609,561, 7 pages.

Office Action dated Sep. 30, 2008 in U.S. Appl. No. 11/356,920, 34 pages.

Response to Office Action filed Dec. 19, 2008 in U.S. Appl. No. 11/356,920, 23 pages.

Notice of Allowance dated Apr. 20, 2009 in U.S. Appl. No. 11/356,920, 10 pages.

Office Action dated Dec. 12, 2007 in U.S. Appl. No. 10/512,687, 20 pages.

Response to Office Action filed on Jun. 9, 2008 in U.S. Appl. No. 10/512,687, 14 pages.

Office Action dated Sep. 10, 2008 in U.S. Appl. No. 10/512,687, 16 pages.

Response to Office Action filed on Dec. 9, 2008 in U.S. Appl. No. 10/512,687, 13 pages.

Advisory Action dated Jan. 7, 2009 in U.S. Appl. No. 10/512,687, 3 pages.

Response to Office Action filed on Feb. 10, 2009 in U.S. Appl. No. 10/512,687, 23 pages.

Office Action dated Apr. 3, 2009 in U.S. Appl. No. 10/512,687, 16 pages.

Response to Office Action filed on Jul. 28, 2009 in U.S. Appl. No. 10/612,687, 18 pages.

(56) References Cited

OTHER PUBLICATIONS

Office Action dated Nov. 18, 2009 in U.S. Appl. No. 10/512,687, 20 pages.
Response to Office Action filed on Mar. 15, 2010 in U.S. Appl. No. 10/612,687, 19 pages.
Office Action dated Oct. 20, 2011 in U.S. Appl. No. 10/612,687, 28 pages.
Response to Office Action filed on Jan. 10, 2012 in U.S. Appl. No. 10/512,687, 14 pages.
Notice of Allowance dated Apr. 27, 2012 in U.S. Appl. No. 10/512,687, 7 pages.
Office Action dated Sep. 23, 2008 in U.S. Appl. No. 11/536,215, 8 pages.
Response to Office Action filed on Nov. 19, 2008 in U.S. Appl. No. 11/536,215, 10 pages.
Notice of Allowance dated Dec. 10, 2008 in U.S. Appl. No. 11/536,215, 9 pages.
Office Action dated Aug. 19, 2008 in U.S. Appl. No. 11/536,233, 8 pages.
Response to Office Action filed on Sep. 17, 2008 in U.S. Appl. No. 11/536,233, 9 pages.
Office Action dated Oct. 27, 2008 in U.S. Appl. No. 11/536,233, 5 pages.
Response to Office Action filed on Nov. 25. 2008 in U.S. Appl. No. 11/536,233, 11 pages.
Office Action dated Mar. 6, 2009 in U.S. Appl. No. 11/536,233, 29 pages.
Response to Office Action filed on Jun. 3, 2009 in U.S. Appl. No. 11/636,233, 16 pages.
Notice of Allowance dated Sep. 16, 2009 in U.S. Appl. No. 11/536,233, 3 pages.
Office Action dated Apr. 23, 2009 in U.S. Appl. No. 11/536,160, 21 pages.
Response to Office Action filed on Jun. 9, 2009 in U.S. Appl. No. 11/536,160, 12 pages.
Notice of Allowance dated Aug. 31, 2009 in U.S. Appl. No. 11/536,160, 19 pages.
Office Actioin dated Mar. 25, 2010 in U.S. Appl. No. 11/964,168, 17 pages.
Response to Office Action filed on Apr. 13, 2010 in U.S. Appl. No. 11/964,168, 10 pages.
Notice of Allowance dated Jul. 8, 2010 in U.S. Appl. No. 11/964,168, 8 pages.

\* cited by examiner

REPLICATING DATA USING DEDUPLICATION-BASED ARRAYS USING NETWORK-BASED REPLICATION

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method to send a snapshot to a replication site includes generating a first snapshot of a production storage volume at a first point in time, generating a second snapshot of the production storage volume at a second point in time after the first point in time, obtaining differences between the first snapshot and the second snapshot, reading signatures from the production storage volume, sending the signatures to the replication site, writing the signatures to the replication site, reading data from changed locations in the second snapshot which is not at the replication site and sending the data from the changed locations to the replication site comprising a replica volume replicating the production storage volume. The production storage volume is part of a deduplication-based storage array.

In another aspect, an apparatus includes electronic hardware circuitry to send a snapshot to a replication site. The circuitry is configured to generate a first snapshot of a production storage volume at a first point in time, generate a second snapshot of the production storage volume at a second point in time after the first point in time, obtain differences between the first snapshot and the second snapshot, read signatures from the production storage volume, send the signatures to the replication site, writing the signatures to the replication site, read data from changed locations in the second snapshot which is not at the replication site and send the data from the changed locations to the replication site comprising a replica volume replicating the production storage volume. The production storage volume is part of a deduplication-based storage array.

In a further aspect, an article includes a non-transitory computer-readable medium that stores computer-executable instructions to send a snapshot to a replication site. The instructions cause a machine to generate a first snapshot of a production storage volume at a first point in time, generate a second snapshot of the production storage volume at a second point in time after the first point in time, obtain differences between the first snapshot and the second snapshot, read signatures from the production storage volume, send the signatures to the replication site, writing the signatures to the replication site, read data from changed locations in the second snapshot which is not at the replication site and send the data from the changed locations to the replication site comprising a replica volume replicating the production storage volume. The production storage volume is part of a deduplication-based storage array.

DETAILED DESCRIPTION

Described herein is an approach to replicate data using deduplication-based arrays using network, based replication.

The following definitions may be useful in understanding the specification and claims.

BACKUP SITE—a facility where replicated production site data is stored; the backup site may be located in a remote site or at the same location as the production site;

BOOKMARK—a bookmark is metadata information stored in a replication journal which indicates a point in time.

DATA PROTECTION APPLIANCE (DPA)—a computer or a cluster of computers responsible for data protection services including inter alia data replication of a storage system, and journaling of I/O requests issued by a host computer to the storage system;

DELTA MARKING STREAM—is the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request (sometimes referred to as an I/O), which may be a read I/O request (sometimes referred to as a read request or a read) or a write I/O request (sometimes referred to as a write request or a write);

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and doting data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

VIRTUAL LOGICAL UNIT—a virtual storage entity which is treated as a logical unit by virtual machines;

WAN—a wide area network that connects local networks and enables them to communicate with one another, such as the Internet.

Figure 1:
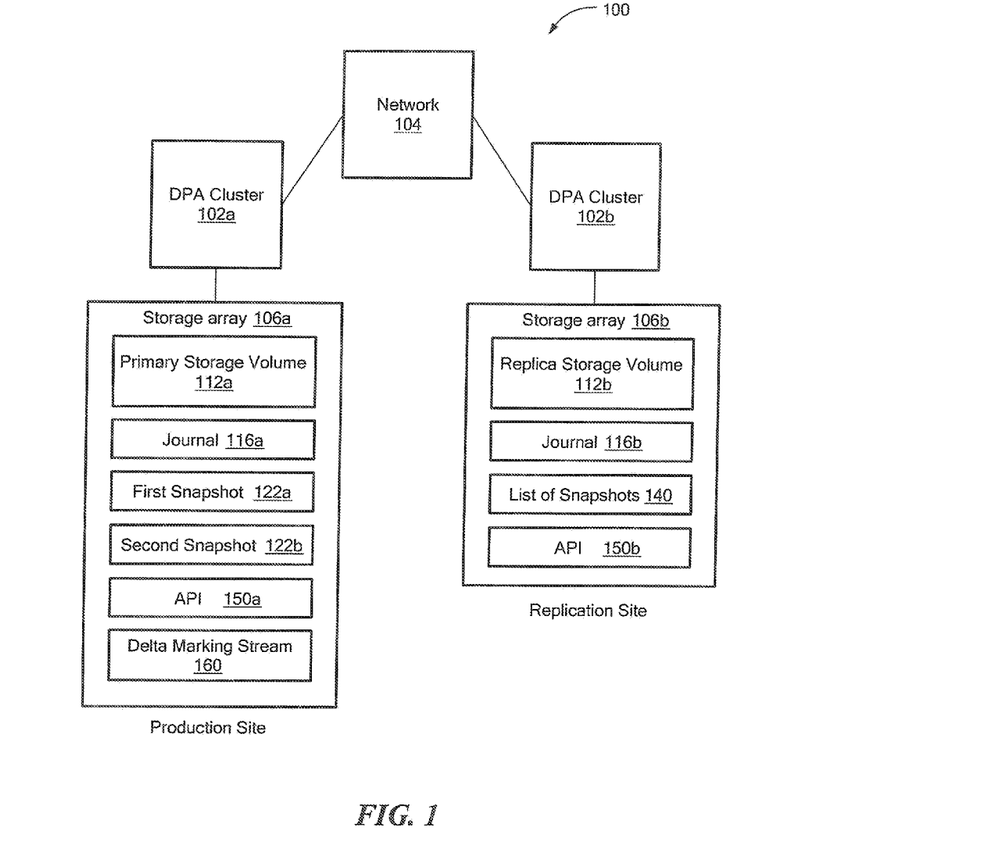
FIG. 1 is a block diagram of an example of a data protection system.

Referring to FIG. 1, a data protection system 100 includes a data protection appliance (DPA) cluster 102a and a storage array 106a at a production site and a DPA cluster 102b and a storage array 106b at a replication site. The DPA clusters 102a, 102b are connected by a network 104 (e.g., a WAN, a Fibre Channel and so forth).

The storage array 106a includes a primary storage volume 112a, a journal 116a, a first snapshot 122a, a second snapshot 122b, application programming interfaces (APIs) 150a and a delta marking stream 160. The storage array 106b includes a replica storage volume 112b which replicates the primary storage 112a, a journal 116b, a list of snapshots 140, and APIs 150b.

The storage arrays 106a, 106b include deduplication-based storage volumes. Deduplication-based storage is a storage paradigm that utilizes deduplication technology at the very core of the storage system. For example, I/Os arriving to the deduplication-based storage volume are divided into fixed chunks of data (e.g., 4K). A cryptographically strong signature or fingerprint is calculated for each data chunk. The uniqueness of this signature is the key factor of this kind of storage so that a data chuck is uniquely identified by its data signature. The deduplication-based storage volumes are sequences of the signature data, with the actual data stored separately. Or viewed in another way, the storage data is a big persistent hash table with the signatures used as keys, and the volumes are sequences of those keys.

Thus, actual data may be stored only once in a system while other components in the system references the data by its signature. This reference relates not only to the actual volume storage of the data, but may also relate to memory caches, snapshots, internal copying of data and so forth. The actual data blocks are not copied but rather their signature is. A reference count is kept on each data block, which counts the number of references to that block. When the block is no longer referenced it is removed from the storage.

In one example, the storage arrays 106a, 106b are flash drives. In order to improve efficiency, the data lookup by signature should be very fast. Since the data lookup is a random access operation by nature it is beneficial that flash technology be used. Deduplication-based storage volumes utilize the high I/O operations per second (IOPS) and random access nature of flash technology. The deduplication complements flash technology limitations by providing a compact representation of the data, and efficiently utilizing the relatively expensive flash capacity. The combination of flash drives and deduplication based storage in the front end forms a very high performance system.

Figure 2:
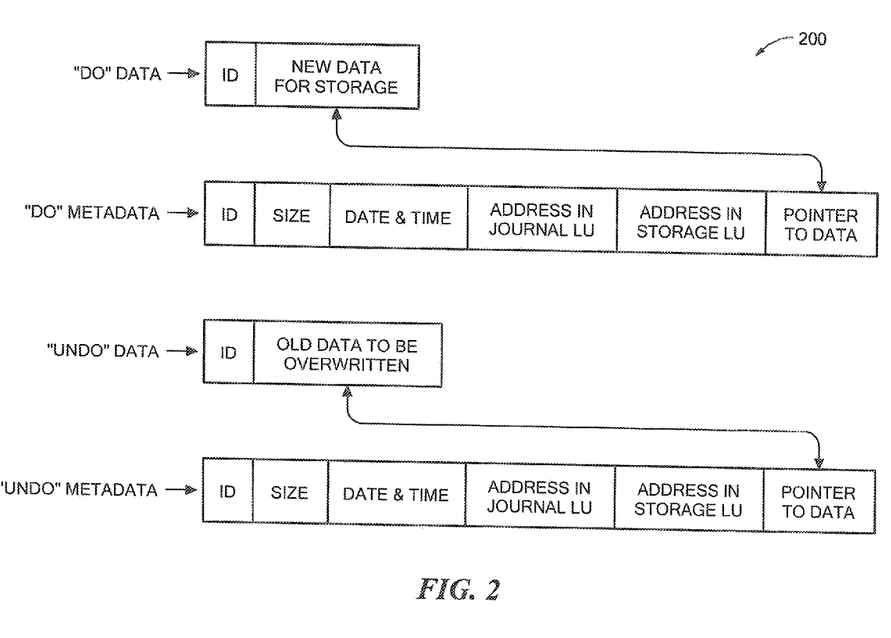
FIG. 2 is an illustration of an example of a journal history of write transactions for a storage system.

Referring to FIG. 2, which is an illustration of a write transaction 200 for a journal. The journal 116a may be used to provide an adaptor for access to storage 112a at the state it was in at any specified point in time. Since the journal contains the "undo" information necessary to roll back storage system 100, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 102a; a write size, which is the size of the data block; a location in journal LU (not shown) where the data is entered; a location in the replica volume 112b where the data is to be written; and the data itself.

Write transaction 200 is transmitted from source side DPA 102a to target side DPA 102b. As shown in FIG. 2, DPA 102b records the write transaction 200 in the journal that includes four streams. A first stream, referred to as a DO stream, includes new data for writing in the replica volume 112b. A second stream, referred to as an DO METADATA stream, includes metadata for the write transaction, such as an identifier, a date & time, a write size, a beginning address in the replica volume 112b for writing the new data in, and a pointer to the offset in the DO stream where the corresponding data is located. Similarly, a third stream, referred to as an UNDO stream, includes old data that was overwritten in the replica volume 112b; and a fourth stream, referred to as an UNDO METADATA, include an identifier, a date & time, a write size, a beginning address in the replica volume 112b where data was to be overwritten, and a pointer to the offset in the UNDO stream where the corresponding old data is located.

In practice each of the four streams holds a plurality of write transaction data. As write transactions are received dynamically by target DPA 102b, they are recorded at the end of the DO stream and the end of the Do METADATA stream, prior to committing the transaction. During transaction application, when the various write transactions are applied to the replica volume 112b, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream. When stored in a deduplication-based storage, the journal data in the DO and UNDO streams is written to aligned with the storage block, i.e. if the deduplication block of the storage is 4 KB, all journaled I/Os start at an offset which is a multiple of 4 KB and are of size which is a multiple of 4 KB.

Figure 3:
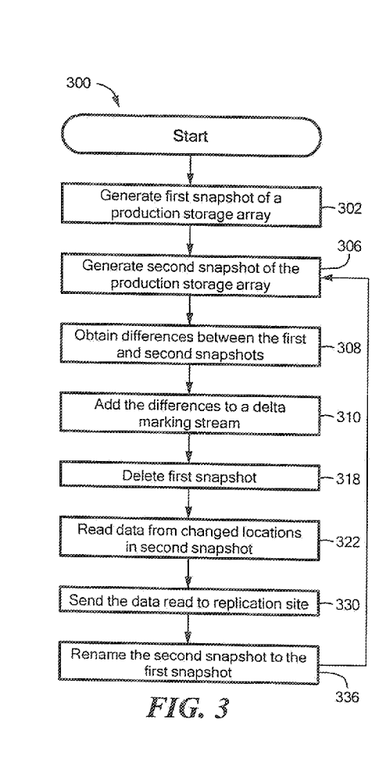
FIG. 3 is a flowchart of an example of a process to provide replication data from a production site to a replication site.

Referring to FIG. 3, an example of a process to send data from the production site to the replication site is a process 300. Process 300 generates a first snapshot of a production storage array (302). For example, the DPA cluster 102*a* generates a first snapshot 122*a* of the primary storage volume 112*a*. In one example, the DPA cluster 102*a* generates the first snapshot 122*a* using the API 150*a*. At first time initialization, the first snapshot is sent to the replica site.

Process 300 generates a second snapshot of a production storage array (304). For example, the DPA cluster 102*a* generates a second snapshot 122*b* of the primary storage volume 112*a*. In one example, the DPA cluster 102*a* generates the second snapshot 122*b* using the API 150*a*.

Process 300 obtains differences between the first snapshot and the second snapshot (308). For example, the DPA cluster 102*a* obtains the differences between the first snapshot 122*a* and the second snapshot 122 by using the API 150*a*.

In one example, obtaining the differences between the first snapshot and the second snapshot may be performed by executing a vendor specific read difference command. The read difference command is a vendor specific command which returns locations of the difference and data in the locations. In one example, the result of executing the read difference command is a sequence of (location, length); (location, length) and so forth. In other examples, the read difference command returns a change bitmap.

Process 300 adds the differences to a delta marking stream (310). For example, the DPA cluster 102*a* adds the differences obtained in processing block 308 to the delta marking stream 160 using an the API 150*a*.

Process 300 deletes the first snapshot (318). For example, the DPA cluster 102*a* deletes the first snapshot 122*a*.

Process 300 reads the data that changed in the second snapshot (322) and sends the data to the replication site (330). For example, the DPA cluster 102*a* reads the data that changed in the second snapshot and sends the data to the DPA cluster 102*b*.

Process 300 renames the second snapshot to the first snapshot (336) and performs processing block 306. For example, the DPA cluster 102*a* renames the second snapshot to the first snapshot.

Figure 4:
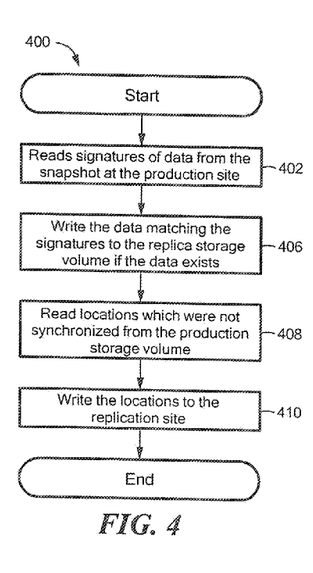
FIG. 4 is a flowchart of an example of a process to read data that changed in a second snapshot.

Referring to FIG. 4, an example of a process to read data that changed in a second snapshot in processing block 322 is a process 400. Process 400 reads signatures of data from the second snapshot at the production site (402). In one example, the signature reading is performed by a vendor specific read signature command, which gets an offset aligned with the de-duplication block size and returns the signatures of the block data at the offset (the block of data is of size of the basic block of the de-dup system say 4 KB, and the signature size may be 32 bytes).

In another example, the signature reading is done by a scattered read signature command and is used from the second snapshot. The scattered read signature command is a two phase command. The replication system sends the deduplication-based storage system a list of offsets to basic blocks of the storage (i.e., each offset relates to 4 KB of data), using a SCSI vendor specific write type command. The scattered read signature command sets a command key as part of its CDB (SCSI Command Descriptor Block, i.e. the metadata of the SCSI command) and the list of requested locations for the signatures in its payload. The list of signatures of the locations sent in the previous command, is then read by a read type command which encodes the common key in its CDB and thus the storage can know which command is referenced. The return is a list of signatures (e.g., 32 bytes each) for each offset required.

Process 400 writes the data matching the signatures to the replica site if the data exists at the replica site (406). In one example the signatures are written to the replication site using a write signature command. In one example, a write signature command may be defined which gets a LUN, offset and signature and writes the data matching the signature to the offset if the data exists and if not, returns a NOT_EXIST status if the signature does not exist at the storage.

In one example, the write signature command may include one or more of the following parameters:

1. LBA (logical block address) for the target of the write
2. Number of blocks of the IO
3. Signature granularity
4. 16 or 32 byte of hash value (or signature), for each signature granularity block (e.g., if granularity is 16 blocks and 64 blocks are written, then there will be 4 signatures each of 16 or 32 bytes).

The signature or hash value size (e.g., 16 byte or 32 byte or any other size) is large enough so that there is very high probability that if two sets of data have the same signature then the two sets of data are identical.

In one particular example, a write signature command (with parameters: LUN A, offset B, 16 blocks, 16 blocks granularity, signature X) means that the storage array will search to determine if there is a data 16 blocks in size stored anywhere, with signature equal to X. If the answer is yes, the storage array will copy the data it found into LUN A offset B, and return a success status message. If the answer is negative, the storage array will return a signature mismatch status, or any other failure status. If the storage array is de-duplication-based storage the storage array will just move a LUN to point to the signature X which points to the data which the signature matches.

In another example, a vendor specific scattered write signature command is used. For example, a scattered write signature command is a two phase command. At the first phase, a list of offsets and signatures is set to the storage a long with a command key. At the second phase, the result on which command succeeds (since the storage had the signatures) and the locations for which the command failed are returned.

Process 400 reads locations from the production storage volume which were not synchronized by the signature synchronization phase (408). For example, process 400 reads locations from the production storage volume 112*a* that were not synchronized by the write signature command. In one example, the data is read at the production using standard SCSI read command. In another example, in order to reduce the number of I/Os initiated by the replication appliance a vendor specific read command may be used, which is a tow phase command the first phase is a write type command getting a list of offsets and lengths, along with a command key, and the second phase is a read based command which gets the key in the SCSI CDB and returns the data for the offset requested in the first phase.

Process 400 writes locations at the replica site (410). In one example the writing of the data at the replication site is done using a standard write command, in other examples, the writing is performed by a vendor specific scattered write command, which is a write command that gets list of offsets and data matching the offsets, and gets a good status indicator only if all I/Os in the list were written successfully.

There are two optional behaviors at the replication site. In one option, a journal is managed at the replica allowing the system to move to any snapshot which was replicated and has data still in the journal.

A second option is not to allow journaling at the replica site and just copying the data directly to the replica volume and once the snapshot has fully arrived at the replica volume generate an array based snapshot of the replica volume. The snapshot is kept until the next time a full snapshot arrives at the replication site, at which point either a new snapshot is generated or the previous snapshot is updated to the new point in time. Since array management of the snapshot requires more resources for bookkeeping of snapshot metadata, arrays usually limit the amount of snapshots allowed unlike journaling which allows keeping infinite number of snapshots.

In one example, the list of snapshots 140 is used to keep track of the snapshots.

Figure 5:
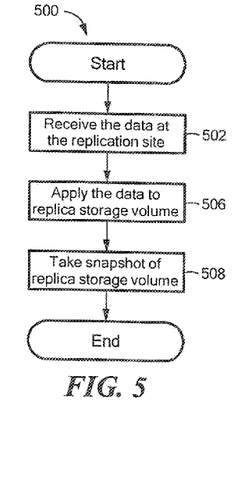
FIG. 5 is a flowchart of an example of a process to use the data provided by the production site to update the replica volume without use of a journal.

Referring to FIG. 5, an example of a process to update the replica volume without using a journal is a process 500. Process 500 receives the data at the replication site (502). For example, the DPA 102b receives the data sent from the RPA 102a from the changed locations in the snapshot 122b in processing block 322.

Process 500 applies the data to the replica volume (506). For example, the DPA 102b applies the data to the replica storage volume 112b.

Process 500 takes a snapshot of the replica volume (508). In this process, data is directly written to the replica volume 112b. Once the full snapshot data is at the replica volume 112b, a snapshot is generated of the replica storage volume 112b using an API to the storage array resulting in a consistent point in time snapshot located at the replication site.

Figure 6:
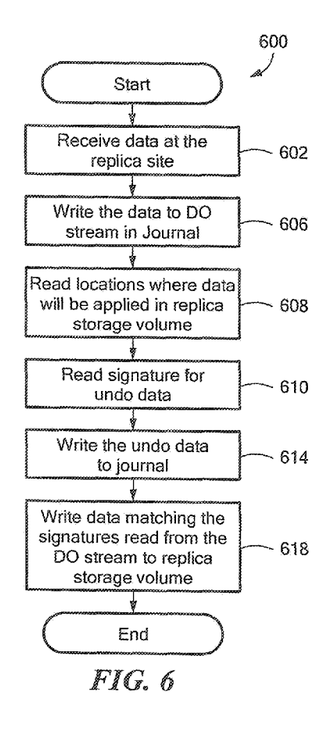
FIG. 6 is a flowchart of an example of a process to use the data provided by the production site to update the replica storage volume using a journal.

Referring to FIG. 6, an example of a process to update the replica storage volume using a journal is a process 600. Process 600 receives the data at the replication site (602). For example, the DPA 102b receives the data sent from the RPA 102a from the changed locations in the snapshot 122b in processing block 322.

Process 600 writes the data received to a DO stream in the journal (606). For example, the DPA cluster 102b writes the data received to a DO stream in the journal 116b. The data is written to be aligned to the deduplication block, (e.g., all I/Os in the journal are to offsets which are multiples of 4 KB and of length multiple of 4 KB).

Process 600 reads the locations where data will be applied in the replica storage volume (608). For example, the DPA cluster 102 reads the offsets from the DO METADATA stream read in processing block 606.

Process 500 reads signatures for the undo data (610), For example, the DPA cluster 102b reads signatures for the undo data from the replica storage volume 112b using a read signature command or a scattered read signature command. It also reads the signatures of the data to apply to the replica volumes from the DO Stream.

A read signature command is a vendor specific SCSI command which gets an offset and a number of blocks, and returns the hash signatures of the blocks, where a block can be the basic block of deduplication, for example, of 4 KB.

Process 600 writes the undo data to the journal (614). For example, the DPA cluster 102b writes the undo data to the UNDO stream in the journal 116b using a write signature command or scattered write signature command and writes the metadata to the UNDO METADATA stream in the journal 116b.

Process 600 writes data matching the signatures read from the DO stream to the replica storage volume (618). For example, the DPA cluster 102b writes data matching the signatures read from the DO stream to the replica storage volume using write signature or scattered write signature command. Process 600 frees data from the DO stream, by overwriting the data with zeros using a SCSI write same or unmap command.

Figure 7:
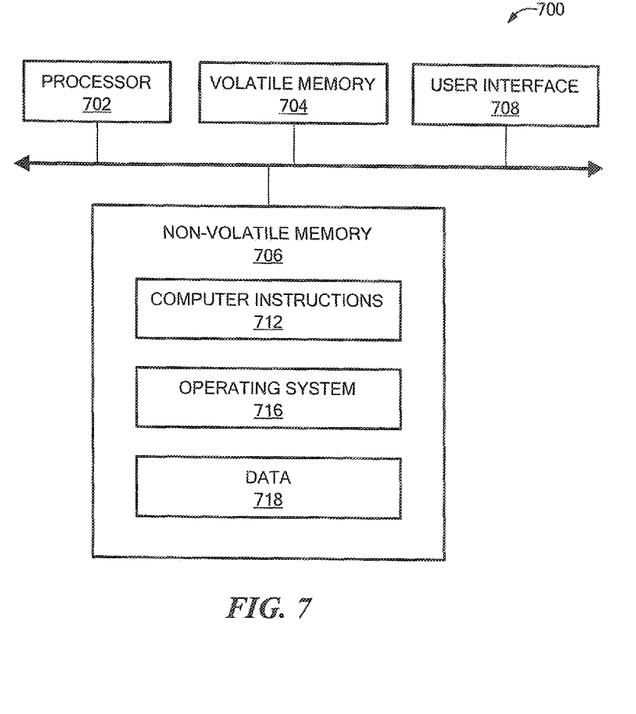
FIG. 7 is a computer on which any of the processes of FIGS. 3 to 6 may be implemented.

Referring to FIG. 7, in one example, a computer 700 includes a processor 702, a volatile memory 704, a non-volatile memory 706 (e.g., hard disk) and the user interface (UI) 708 (e.g., a graphical user interface, a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., processes 300, 400, 500 and 600).

The processes described herein (e.g., processes 300, 400, 500 and 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 300, 400, 500 and 600 are not limited to the specific processing order of FIGS. 3 to 6, respectively. Rather, any of the processing blocks of FIGS. 3 to 6 may be re-ordered, combined or removed, performed in parallel or in serial, as necessary, to achieve the results set forth above.

The processing blocks (for example, in the processes 300, 400, 500 and 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
   replicating data from a production site to a replication site comprising:
   generating a first snapshot of a production storage volume at a first point in time, using an application programming interface (API), the production storage volume is part of a first deduplication-based storage array at the production site, the first snapshot and the API being stored at the first deduplication-based storage array;
   generating a second snapshot of the production storage volume at a second point in time after the first point in time, the second snapshot being stored at the first deduplication-based storage array;
   obtaining differences between the first snapshot and the second snapshot, using the API, to determine changed locations in the second snapshot having data different than corresponding locations in the first snapshot;
   adding the differences between the first snapshot and the second snapshot to a delta marking stream stored on the first deduplication-based storage array using a first data protection appliance (DPA) coupled to the first deduplication-based storage array;
   reading signatures of data from the changed locations in the second snapshot;
   sending the signatures to the replication site;
   writing the signatures to the replication site;
   reading, using the first DPA, the data from the changed locations in the second snapshot which is not at the replication site after writing the signatures to the replication site; and
   sending the data from the changed locations which is not at the replication site from the first DPA to a second DPA at the replication site comprising a replica volume replicating the production storage volume, the replica volume being stored on a second deduplication-based storage array coupled to the second DPA.

2. The method of claim 1, further comprising:
   deleting the first snapshot using the first DPA; and
   renaming the second snapshot to the first snapshot using the first DPA.

3. The method of claim 1, further comprising:
   receiving the data from the changed locations using the second DPA at the replication site;
   applying the data to the replica volume using the second DPA; and
   taking a snapshot of the replica volume using a second API stored on the second deduplication-based storage array.

4. The method of claim 1, further comprising:
   receiving the data from the changed locations at the replication site;
   writing the data to a DO stream in a journal at the replication site, the journal comprising the DO stream, a DO METADATA stream comprising pointers to offsets in the DO stream where corresponding data is located, an UNDO stream comprising old data that was overwritten in the replica volume, and an UNDO METADATA, stream comprising pointers to offsets in the UNDO stream where corresponding old data is located;
   reading locations where data will be applied in the replica storage volume;
   reading signatures for undo data;
   reading the signatures from the DO stream;
   writing the undo data to the journal; and
   writing data to the replica storage volume using write signature commands.

5. The method of claim 4 wherein reading the signatures comprises reading signatures using one of a read signature command or a scattered read signature command,
   wherein writing signatures comprises writing signatures using one of a write signature command or a scattered write signature command,
   wherein reading the data comprises reading the data using one of a read command or a scattered read command, and
   wherein writing the data comprises writing data using one of a write command or a scattered write command.

6. An apparatus, comprising:
   electronic hardware circuitry to replicate data from a production site to a replication site, the circuitry configured to:
   generate a first snapshot of a production storage volume at a first point in time, using an application programming interface (API), the production storage volume is part of a first deduplication-based storage array at the production site, the first snapshot and the API being stored at the first deduplication-based storage array;
   generate a second snapshot of the production storage volume at a second point in time after the first point in time, the second snapshot being stored at the first deduplication-based storage array;
   obtain differences between the first snapshot and the second snapshot, using the API, to determine changed locations in the second snapshot having data different than corresponding locations in the first snapshot;
   add the differences between the first snapshot and the second snapshot to a delta marking stream stored on the first deduplication-based storage array using a first data protection appliance (DPA) coupled to the first deduplication-based storage array;
   read signatures of data from the changed locations in the second snapshot;
   send the signatures to the replication site;
   write the signatures to the replication site;
   read, using the first DPA, the data from the changed locations in the second snapshot which is not at the replication site after writing the signatures to the replication site; and send the data from the changed locations which is not at the replication site from the first DPA to a second DPA at the replication site comprising a replica volume replicating the production storage volume, the replica volume being stored on a second deduplication-based storage array coupled to the second DPA.

7. The apparatus of claim 6 wherein the circuitry comprises at least one of a processor, a memory, a programmable logic device or a logic gate.

8. The apparatus of claim 6, further comprising circuitry configured to add the differences between the first snapshot and the second snapshot to a delta marking stream.

9. The apparatus of claim 6, further comprising circuitry configured to:
delete the first snapshot; and
rename the second snapshot to the first snapshot.

10. The apparatus of claim 6, further comprising circuitry configured to:
receive the data from the changed locations at the replication site;
apply the data to the replica storage volume; and
take a snapshot of the replica storage volume.

11. The apparatus of claim 6, further comprising circuitry configured to:
receive the data from the changed locations at the replication site;
write the data to a DO stream in a journal at the replication site, the journal comprising the DO stream, a DO METADATA stream comprising pointers to offsets in the DO stream where corresponding data is located, an UNDO stream comprising old data that was overwritten in the replica volume, and an UNDO METADATA, stream comprising pointers to offsets in the UNDO stream where corresponding old data is located;
read locations where data will be applied in the replica storage volume;
read signatures for undo data;
read the signatures from the DO stream;
write the undo data to the journal; and
write data to the replica storage volume using write signature commands.

12. The apparatus of claim 11 wherein the circuitry configured to read the signatures comprises circuitry configured to read signatures using one of a read signature command or a scattered read signature command,
wherein the circuitry configured to write signatures comprises circuitry configured to write signatures using one of a write signature command or a scattered write signature command,
wherein the circuitry configured to read the data comprises circuitry configured to read the data using one of a read command or a scattered read command, and
wherein the circuitry configured to write the data comprises circuitry configured to write data using one of a write command or a scattered write command.

13. An article comprising:
a non-transitory computer-readable medium that stores computer-executable instructions to replicate data from a production site to a replication site, the instructions causing a machine to:
generate a first snapshot of a production storage volume at a first point in time, using an application programming interface (API), the production storage volume is part of a first deduplication-based storage array at the production site, the first snapshot and the API being stored at the first deduplication-based storage array;
generate a second snapshot of the production storage volume at a second point in time after the first point in time, the second snapshot being stored at the first deduplication-based storage array;
obtain differences between the first snapshot and the second snapshot, using the API, to determine changed locations in the second snapshot having data different than corresponding locations in the first snapshot;
add the differences between the first snapshot and the second snapshot to a delta marking stream stored on the first deduplication-based storage array using a first data protection appliance (DPA) coupled to the first deduplication-based storage array;
read signatures of data from the changed locations in the second snapshot;
send the signatures to the replication site;
write the signatures to the replication site;
read, using the first DPA, the data from the changed locations in the second snapshot which is not at the replication site after writing the signatures to the replication site; and
send the data from the changed locations which is not at the replication site from the first DPA to a second DPA at the replication site comprising a replica volume replicating the production storage volume, the replica volume being stored on a second deduplication-based storage array coupled to the second DPA.

14. The article of claim 13, further comprising instructions causing the machine to add the differences between the first snapshot and the second snapshot to a delta marking stream.

15. The article of claim 13, further comprising instructions causing the machine to:
delete the first snapshot; and
rename the second snapshot to the first snapshot.

16. The article of claim 13, further comprising instructions causing the machine to:
receive the data from the changed locations at the replication site;
apply the data to the replica storage volume; and
take a snapshot of the replica storage volume.

17. The article of claim 13, further comprising instructions causing the machine to:
receive the data from the changed locations at the replication site;
write the data to a DO stream in a journal at the replication site, the journal comprising the DO stream, a DO METADATA stream comprising pointers to offsets in the DO stream where corresponding data is located, an UNDO stream comprising old data that was overwritten in the replica volume, and an UNDO METADATA, stream comprising pointers to offsets in the UNDO stream where corresponding old data is located;
read locations where data will be applied in the replica storage volume;
read signatures for undo data;
read the signatures from the DO stream;
write the undo data to the journal; and
write data to the replica storage volume using write signature commands.

18. The article of claim 17 wherein the instructions causing the machine to read the signatures comprises instructions causing the machine to read signatures using one of a read signature command or a scattered read signature command,
wherein the instructions causing the machine to write signatures comprises instructions causing the machine to write signatures using one of a write signature command or a scattered write signature command, wherein the instructions causing the machine to read the data comprises instructions causing the machine to read the data using one of a read command or a scattered read command, and wherein the instructions causing the machine to write the data comprises instructions causing the machine to write data using one of a write command or a scattered write command.

* * * * *